(12) United States Patent
Lehnst

(10) Patent No.: US 6,329,911 B1
(45) Date of Patent: Dec. 11, 2001

(54) AIRBAG ACTUATING ARRANGEMENT

(75) Inventor: Thomas Lehnst, Braunschweig (DE)

(73) Assignee: Volkswagne AG (DE)

( * ) Notice: Subject to any disclaimer, the term of this patent is extended or adjusted under 35 U.S.C. 154(b) by 0 days.

(21) Appl. No.: 09/587,447

(22) Filed: Jun. 5, 2000

Related U.S. Application Data

(62) Division of application No. 09/267,831, filed on Mar. 12, 1999.

(30) Foreign Application Priority Data

Mar. 14, 1998 (DE) .................................. 198 11 182

(51) Int. Cl.⁷ ..................................... B60Q 1/00
(52) U.S. Cl. ................ 340/436; 180/282; 280/735; 340/438; 701/45
(58) Field of Search .................. 340/436, 438; 307/10.1; 280/735; 180/282, 271; 701/45, 29

(56) References Cited

U.S. PATENT DOCUMENTS

| | | | |
|---|---|---|---|
| 5,069,479 | 12/1991 | Koide et al. | 280/734 |
| 5,164,901 | 11/1992 | Balckburn et al. | 340/436 |
| 5,324,074 | 6/1994 | Christian et al. | 280/731 |
| 5,493,270 | 2/1996 | Kondo | 340/438 |
| 5,544,914 | 8/1996 | Borinski et al. | 280/735 |
| 5,641,952 | 6/1997 | Collings | 200/43.08 |
| 5,915,725 | 6/1999 | Schmid et al. | 280/735 |
| 5,977,653 | 11/1999 | Schmid et al. | 307/10.1 |
| 6,016,884 | 1/2000 | Swart et al. | 180/282 |
| 6,045,156 | 4/2000 | Spell et al. | 280/735 |
| 6,181,021 * | 1/2001 | Zabler et al. | 340/310.07 |

FOREIGN PATENT DOCUMENTS

| | | |
|---|---|---|
| 4237142 | 4/1993 | (DE) . |
| 4426090 | 7/1995 | (DE) . |
| 19545868 | 6/1997 | (DE) . |
| 19628763 | 8/1997 | (DE) . |
| 0719681 | 7/1996 | (EP) . |
| 2289563 | 11/1995 | (GB) . |

OTHER PUBLICATIONS

European Search Report No. EP 99 10 4270 dated Jan. 1, 2000.

* cited by examiner

*Primary Examiner*—Brent A. Swarthout
(74) *Attorney, Agent, or Firm*—Baker Botts LLP

(57) ABSTRACT

An arrangement for actuating an airbag includes an airbag control unit, an actuating switch, a visual display device and an intermediate electronics unit. The intermediate electronics checks the visual display device and the actuating switch for functionality.

3 Claims, 2 Drawing Sheets

AIRBAG ACTUATING ARRANGEMENT

This appl. is a divisional of Ser. No. 09/267,831, filed Mar. 12, 1999.

BACKGROUND OF THE INVENTION

This invention relates to arrangements for actuating airbags which include an airbag control unit, an actuating switch for activating and deactivating the airbag, and a visual display device.

Motor vehicles are increasingly being provided with airbags which expand in the event of a collision to protect the driver or passenger against an impact with hard parts of the vehicle structure. However, the airbag should be capable of being switched off, first so that it will not be released when a passenger seat is unoccupied, and second in order not to injure the driver or passenger in certain situations, for example when a child seat is placed on the passenger seat.

For this purpose, a mechanical switch is inserted in the circuit between the control unit and the airbag by which the airbag control unit can be electrically separated from the airbag. Such a switch is disclosed for example in U.S. Pat. No. 5,641,952. Simultaneously with the electrical separation, a visual display, for example in LED form, is energized so that the deactivation of the airbag is visually indicated. The electrical separation caused by actuation of the switch produces an open condition at the terminals of the airbag control unit and this might cause a malfunction since the airbag control unit cannot distinguish between an open condition due to a switching operation and a line interruption. Therefore, a safety resistor is inserted following the actuating switch in parallel with the airbag. This safety resistor has the same resistance value as the resistance of the firing pellet for the airbag. The actuating switch is arranged to complete the electric switch circuit either by way of the airbag or by way of the safety resistor so that the airbag control unit is always presented with the same resistive load.

Furthermore, there are conventional airbag control units that are electrically connected to the airbag in a permanent manner and have a visual display associated directly with the airbag control unit. In such arrangements, the airbag control unit is connected through two resistances in series to a source of operating voltage. The actuating switch is arranged in parallel with one of the resistances so that that resistance is short-circuited when the switch is closed. The resulting change in total resistance is detected by the airbag control unit by the corresponding change of current, causing the visual display to be turned on. A defect in the visual display device can also be detected by the airbag control unit by a change of current despite an unchanged electrical connection. In that case, the airbag control unit will not generate a firing signal for the airbag. However, this very advanced concept requires a completely redesigned airbag control unit so that considerable retrofitting would be required to meet the same safety standards in older motor vehicles.

SUMMARY OF THE INVENTION

Accordingly, it is an object of the invention to provide an airbag actuating arrangement which overcomes disadvantages of the prior art.

Another object of the invention is to provide an arrangement for actuating an airbag that results in improved safety but is capable of being added to conventional airbag control units.

These and other objects of the invention are attained by providing an airbag actuating arrangement having an intermediate electronics unit by which the airbag may be disconnected while presenting the same resistance to the control unit. In one embodiment, the intermediate electronics unit is arranged between the control unit and the airbag so that the intermediate electronics unit controls the electrical release or the airbag, i.e. converts a firing pulse from the airbag control unit when appropriate into an airbag igniter pulse or suppresses the firing pulse if the airbag is not activated. Since a visual display and an actuating switch are associated directly with the intermediate electronics unit, the intermediate electronics unit will detect a defect directly, for example because of a change in a test current. This defect signal is then transmitted to the airbag control unit which can indicate that fact to the motor vehicle operator or passenger.

With a parallel arrangement of the intermediate electronics unit and the airbag control unit, a firing pulse generated by the control unit is passed on to the airbag through the actuating switch. With this arrangement, a visual display is associated with the intermediate electronics unit and testable by that unit for functionality, whereas the actuating switch is tested using an error line and a test line. This ensures that any defect in the visual display device will be reliably detected. In another embodiment, a defect of the intermediate electronic unit will have no direct effect on the airbag which remains entirely ready for service.

By providing different identification resistances for the visual display device and/or the actuating switches, the components associated with the driver and passenger airbags can be identified by the intermediate electronics so that a possible mistake in installation can be recognized by the intermediate electronics unit and indicated to the airbag control unit. Preferably each identification resistance constitutes an integral unit with its associated airbag component thus avoiding any interchange of identification resistances at installation.

BRIEF DESCRIPTION OF THE DRAWING

Further objects and advantages of the invention will be apparent from a reading of the following description in conjunction with the accompanying drawings, in which.

DESCRIPTION OF PREFERRED EMBODIMENT

Figure 1:
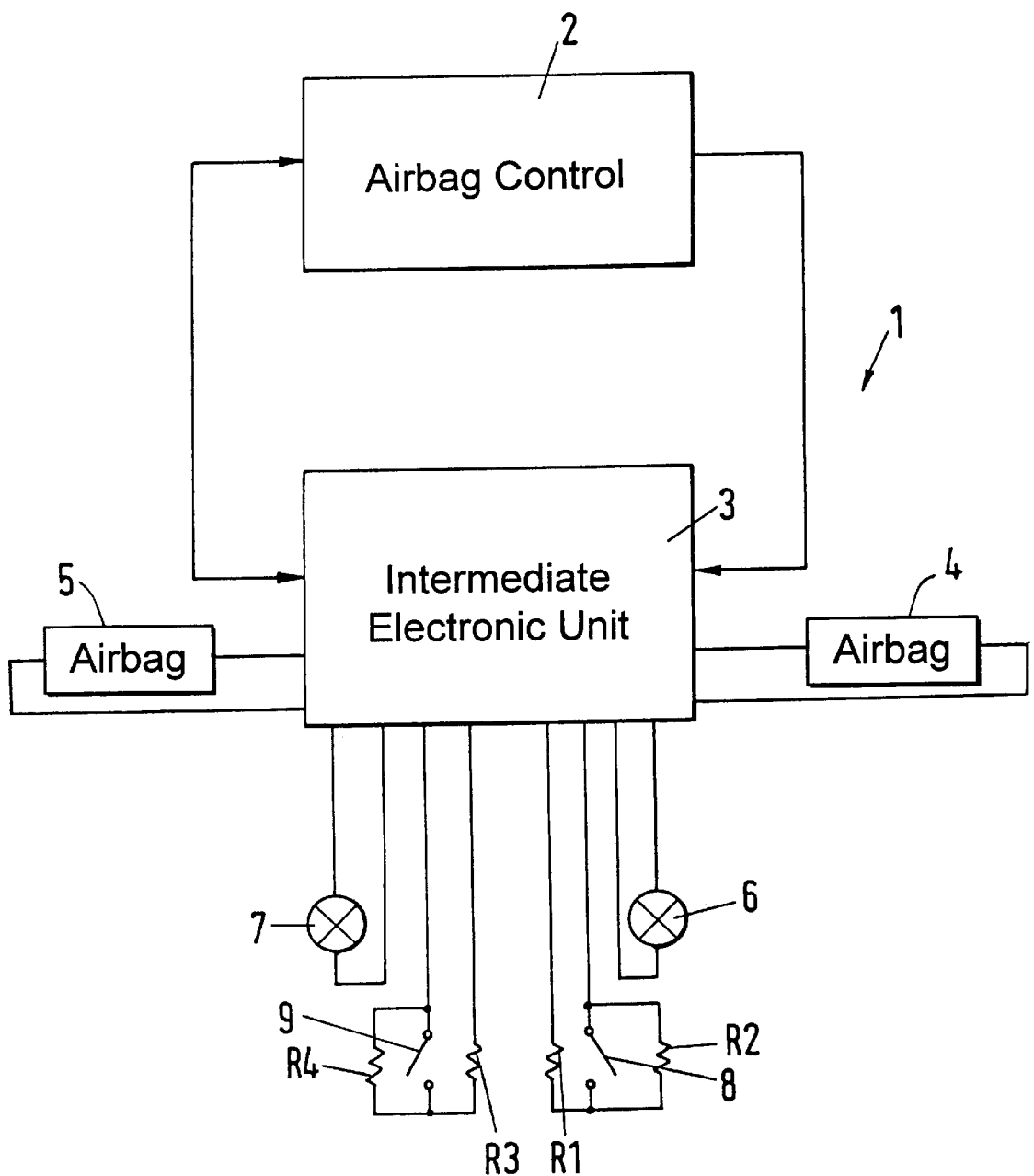
FIG. 1 is a schematic block diagram illustrating a representative embodiment of an arrangement for actuating an airbag having an intermediate electronics unit.

In the typical embodiment of the invention shown in FIG. 1, an arrangement for actuating an airbag includes an airbag control unit 2, an intermediate electronics unit 3, a driver airbag 4, a passenger airbag 5, two visual display devices 6 and 7, two actuating switches 8 and 9, and four identification resistances R1–R4 associated with the actuating switches 8 and 9. The intermediate electronics unit 3 is interposed between the airbag control unit 2 and the two airbags 4 and 5, the intermediate electronics unit 3 being bidirectionally connected to the airbag control unit 2. Further, the intermediate electronics unit 3 is connected through separate circuits to each of the two airbags 4 and 5. Similarly, the visual display devices 6 and 7 and the actuating switches 8 and 9 are connected in separate circuits to the intermediate electronics unit 3, the visual display device 6 and actuating switch 8 being associated with the driver airbag 4 and the visual display device 7 and actuating switch 9 being associated with the passenger airbag 5.

Thus, the intermediate electronics unit 3 decouples the airbag control unit 2 and all of the other components from each other.

The intermediate electronics unit 3 in this embodiment provides several functions. In the first place, the airbag control unit 2 is provided through the intermediate electronics unit 3 with a termination having a resistance which corresponds to the firing pellet resistance of the airbags 4 and 5. Moreover, the intermediate electronics unit 3 causes the firing of the airbags 4 and 5 and monitors the visual display devices 6 and 7 and the actuating switches 8 and 9. The operation of this embodiment is described in more detail below in connection with the driver airbag 4, all of the description applying analogously to the operation of the passenger airbag 5.

To permit actuation of the driver airbag 4, the actuating switch 8 is opened. The position of the switch is queried by the intermediate electronics unit 3 by passing current through the switch circuit. When the actuating switch 8 is open, the current flows by way of the resistances R1 and R2 in series, whereas when the actuating switch 8 is closed, the resistance R2 is short-circuited. If the airbag control unit 2 detects a negative acceleration of the vehicle sufficient to cause the airbag 4 to be released, the airbag control unit 2 generates a firing pulse. This firing pulse is detected by the intermediate electronics unit 3 which then either passes on the firing pulse directly to the airbag 4 or generates a corresponding firing pulse.

To prevent actuation of the airbag 4, the actuating switch 8 is closed manually. This condition is detected by the intermediate electronics unit 3 through the change in the resistance of the switch circuit. The intermediate electronics unit 3 thereupon switches on the visual display device 6, which may be for example an incandescent light. Proper functioning of the visual display device 6 is also checked by the intermediate electronics unit 3.

In this case, if the airbag control unit 2 or an associated acceleration sensor detects a negative acceleration of the vehicle which would normally cause the airbag 4 to be activated, the airbag control unit 2 generates a firing pulse but, with the switch 8 closed, this firing pulse is ignored by the intermediate electronics unit 3, and does not cause generation of a corresponding firing pulse in the intermediate electronics unit 3.

In addition, the visual display device 6 may have a corresponding identification resistance. All of the identification resistances have a different resistance value so that the corresponding component can always be detected without ambiguity. Moreover, the intermediate electronics unit 3 passes on detected errors to the airbag control unit 2. For this purpose a leak resistance with a high resistance value, for example, is associated with the airbag 4 which the airbag control unit detects and interprets as a malfunction of the airbag.

Figure 2:
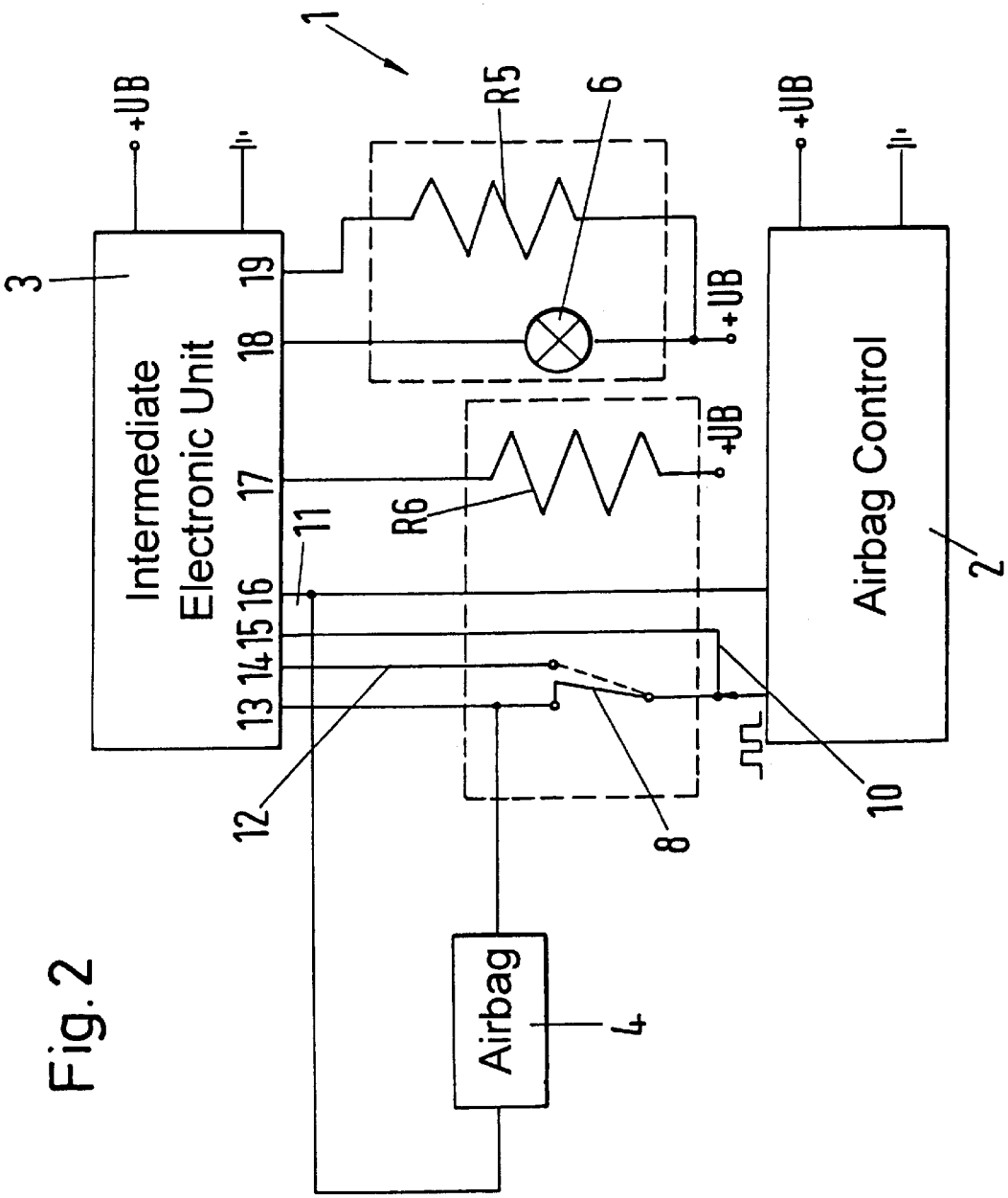
FIG. 2 is a schematic block diagram illustrating another representative embodiment of the invention having error and test lines.

An alternative embodiment of the airbag actuating arrangement is shown in FIG. 2 in which, for the sake of clarity, only the driver airbag 4 with its associated components is illustrated. In this arrangement, the airbag control unit 2 is connected to the airbag 4 by closing the actuating switch 8 so that the circuit back to the airbag control unit 2 is closed. An electrical signal line is connected from the actuating switch 8 to an input 13 of the intermediate electronics unit 3. The input signal on the line 13 to the unit 3 provides two functions. First, the actuating switch 8 is checked for functionality when it is closed, and second, when the switch 8 is open to prevent activation of the airbag 4 the activation circuit is terminated with a low resistance.

Furthermore, an error line 10 connects the other side of the actuating switch 8 to an input 15 to the intermediate electronics unit 3 to transmit test pulses arriving from the airbag control unit 2 to the intermediate electronics unit 3. In addition, a test line 11 following the switch 8 is connected between the airbag control unit 2 and an input 16 to the intermediate electronics unit 3. The test line 11 may be connected either ahead of or following the airbag 4. The part of the electronics in the intermediate electronics unit 3 associated with the input 16 provides a low resistance termination for the deactivated airbag. Also, in the event of a detected malfunction there is a leak resistance having a high resistance value so that the airbag control unit 2 can detect a malfunction of the airbag by detection of a resistance which is not equal to the firing pellet resistance of the airbag 4.

To activate the airbag 4 in the embodiment of FIG. 2, the switch 8 is closed. The switch position can be queried by test pulses generated by the airbag control unit 2. If the test pulses are detected both on the error line 10 and on the test line 11, the switch 8 is closed. If the test pulses are detected only on the error line 10 and the line 12, the switch 8 is open. With other combinations, a defect in the airbag actuating arrangement 1 can be inferred. If the switch 8 is closed and the airbag control unit 2 detects a negative acceleration of the vehicle which should activate the airbag 4, the airbag control unit 2 generates a firing pulse which is transmitted to the airbag 4 through the switch 8. If the switch 8 is open preventing transmission of a firing pulse, i.e. the airbag 4 is deactivated, the intermediate electronics unit 3 simulates the firing pellet resistance for the airbag control unit 2 through the input 14. Further, the switch 8 is provided with an identification resistance R6 that preferably forms an integral unit with the switch 8. The identification resistance R6 is connected to an input 17 to the intermediate electronics unit 3 to permit verification by that unit.

Although the invention has been described herein with reference to specific embodiments, many modifications and variations therein will readily occur to those skilled in the art. Accordingly, all such variations and modifications are included within the intended scope of the invention.

I claim:

1. An arrangement for actuating at least one airbag comprising:
   an airbag control unit;
   at least one actuating switch for supplying an activating signal to the airbag;
   visual display means; and
   intermediate electronics means connected in parallel with the airbag control unit and connected to the visual display means, the airbag control unit being connected through an error line bypassing the actuating switch to the intermediate electronics means, and the intermediate electronics means being connected through a test line by passing the actuating switch to the airbag, the intermediate electronics means also providing an input resistance to the airbag control unit corresponding to a firing pellet resistance of the airbag when the airbag is deactivated.

2. An arrangement according to claim 1 wherein the actuating switch and/or the visual display means are each associated with at least one identification resistance.

3. An arrangement according to claim 1 wherein the actuating switch and/or the visual display means forma an integral unit with an associated identification resistance.

* * * * *

UNITED STATES PATENT AND TRADEMARK OFFICE
CERTIFICATE OF CORRECTION

PATENT NO.     : 6,329,911 B1
DATED          : December 11, 2001
INVENTOR(S)    : Lehnst It is certified that error appears in the above-identified patent and that said Letters Patent is hereby corrected as shown below:

<u>Title page,</u>
Item [73], Assignee, "Volkswagne AG (DE)" should read -- Volkswagen AG, Residence: Wolfsburg, Germany --

Signed and Sealed this

Fifth Day of November, 2002

*Attest:*

JAMES E. ROGAN
*Attesting Officer*        *Director of the United States Patent and Trademark Office*